US011409790B2

(12) United States Patent
Roy et al.

(10) Patent No.: US 11,409,790 B2
(45) Date of Patent: Aug. 9, 2022

(54) MULTI-IMAGE INFORMATION RETRIEVAL SYSTEM

(71) Applicant: Dell Products L.P., Round Rock, TX (US)

(72) Inventors: Mainak Roy, Kolkata (IN); Chitrak Gupta, Bangalore (IN); Rathi Babu, Bangalore (IN); Lavy T. Moncy, Bangalore (IN); Thomas Mathew, Bangalore (IN); Upendran Boovaraha, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 121 days.

(21) Appl. No.: 16/286,953

(22) Filed: Feb. 27, 2019

(65) Prior Publication Data

US 2020/0272655 A1 Aug. 27, 2020

(51) Int. Cl.
| | |
|---|---|
| *G06F 16/583* | (2019.01) |
| *G06F 17/15* | (2006.01) |
| *G06F 16/532* | (2019.01) |
| *G06F 16/538* | (2019.01) |

(52) U.S. Cl.
CPC .......... *G06F 16/583* (2019.01); *G06F 16/532* (2019.01); *G06F 16/538* (2019.01); *G06F 17/15* (2013.01)

(58) Field of Classification Search
CPC ...... G06F 16/583; G06F 17/15; G06F 16/532; G06F 16/538
See application file for complete search history.

(56) References Cited

U.S. PATENT DOCUMENTS

| | | | |
|---|---|---|---|
| 9,779,187 B1* | 10/2017 | Gao | G06F 16/212 |
| 10,664,515 B2* | 5/2020 | Sacheti | G06T 1/0007 |
| 2015/0161178 A1* | 6/2015 | B Doiu | G06F 16/24554 |
| | | | 707/723 |
| 2019/0121808 A1* | 4/2019 | Chadha | G06F 16/2365 |

* cited by examiner

*Primary Examiner* — William B Partridge
*Assistant Examiner* — Aryan D Toughiry
(74) *Attorney, Agent, or Firm* — Terrile, Cannatti & Chambers; Emmanuel A. Rivera

(57) ABSTRACT

A system, method, and computer-readable medium are disclosed for improved image search and retrieval. In various embodiments, a multi-image information retrieval system is implemented to perform image searching and provide image search results based on user intent. Returned image results include correlated images and associated information regarding objects such as product lines. Images can include metatags and are updated with correlated information.

20 Claims, 7 Drawing Sheets

MULTI-IMAGE INFORMATION RETRIEVAL SYSTEM

BACKGROUND OF THE INVENTION

Field of the Invention

The present invention relates to the management of information handling systems. More specifically, embodiments of the invention provide a system, method, and computer-readable medium for improved image search and retrieval.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As image searches are getting more and more popular, there is a desire to produce results that meet information requirements based on an image search, and in particular when a search originates from different search engines based on the same set of source files. One image may not provide the completeness of the information requested. For example, it would be desirable to obtain all the required images as a cluster that are in chronological order to solve a user's search purpose and link images between corresponding information. It would also be desirable to use a specific image to describe multiple parts of different solution workflows. Although there may be different methods and strategies that are directed to image searching, such strategies may only focus on an image file, and are not directed to image and content correlation.

When a user conducts an image search query for a particular product or products, the search results may return the wrong image and/or unwanted information. The returned image and information may not include relevant information that is based on the search query. The image may be misleading, be too generic, or associated with misleading information or no information. For example, if a user performs an image search query for a particular server computer, the search results may be generic images and irrelevant information regarding the particular server computer.

Certain image search strategies may be specific to particular search engines, web browsers, and databases. Such strategies may only be implemented through specific user interfaces. Typically, such search strategies make guesses as to text associated with images. Indexing or use of standard metadata is not implemented with such image searching. Other image search strategies do not provide for a change in representation based on a user's persona and intent. Such search strategies typically cluster images based on a minimum match that is found on search strings, and potential images are grouped together.

SUMMARY OF THE INVENTION

A system, method, and computer-readable medium are disclosed for improved image search and retrieval. In various embodiments, a multi-image information system is implemented to perform image searching and provide image search results based user intent. Returned image results include correlated images and information regarding objects such as product lines. Images can include metatags and are updated with correlated information.

In various embodiments, search request are received base on an image. Searches are performed for objects that the image describes. User intent is determined as to the search request. Correlation is performed with the other images and information that are related to targets, identified objects, topics, products, technology, etc. Results are returned which can include information such as workflow solutions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for image search and retrieval. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
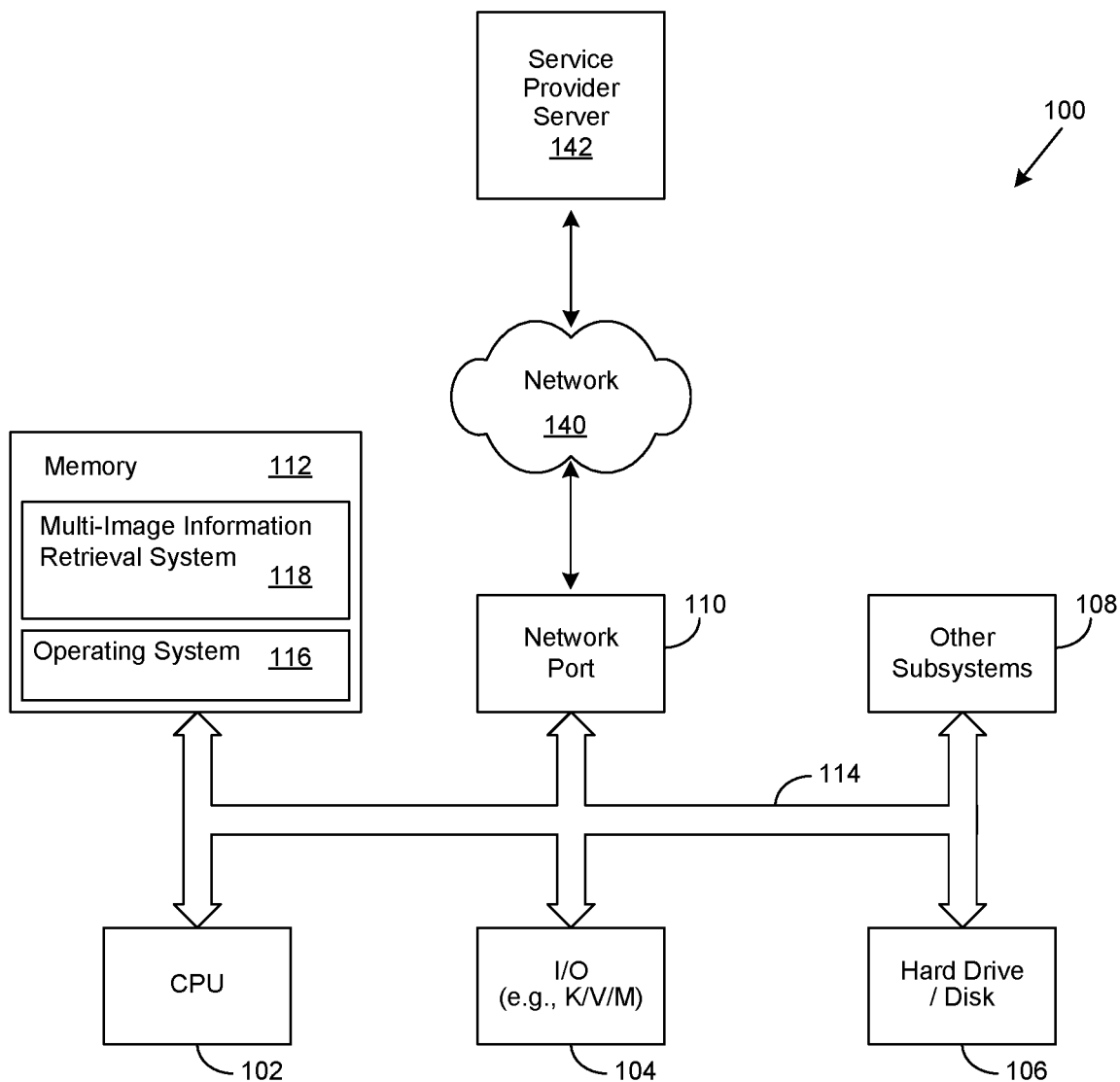
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a keyboard, a video/display, a mouse, and associated controllers (e.g., K/V/M), a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also include a multi-image information retrieval system 118. In certain embodiments, the multi-image information retrieval system 118 is configured to support multiple products and/or services that are provided by different companies, vendors, suppliers, etc. In certain implementations, the multi-image information retrieval system 118 is provided as a service from the service provider server 142.

Figure 2:
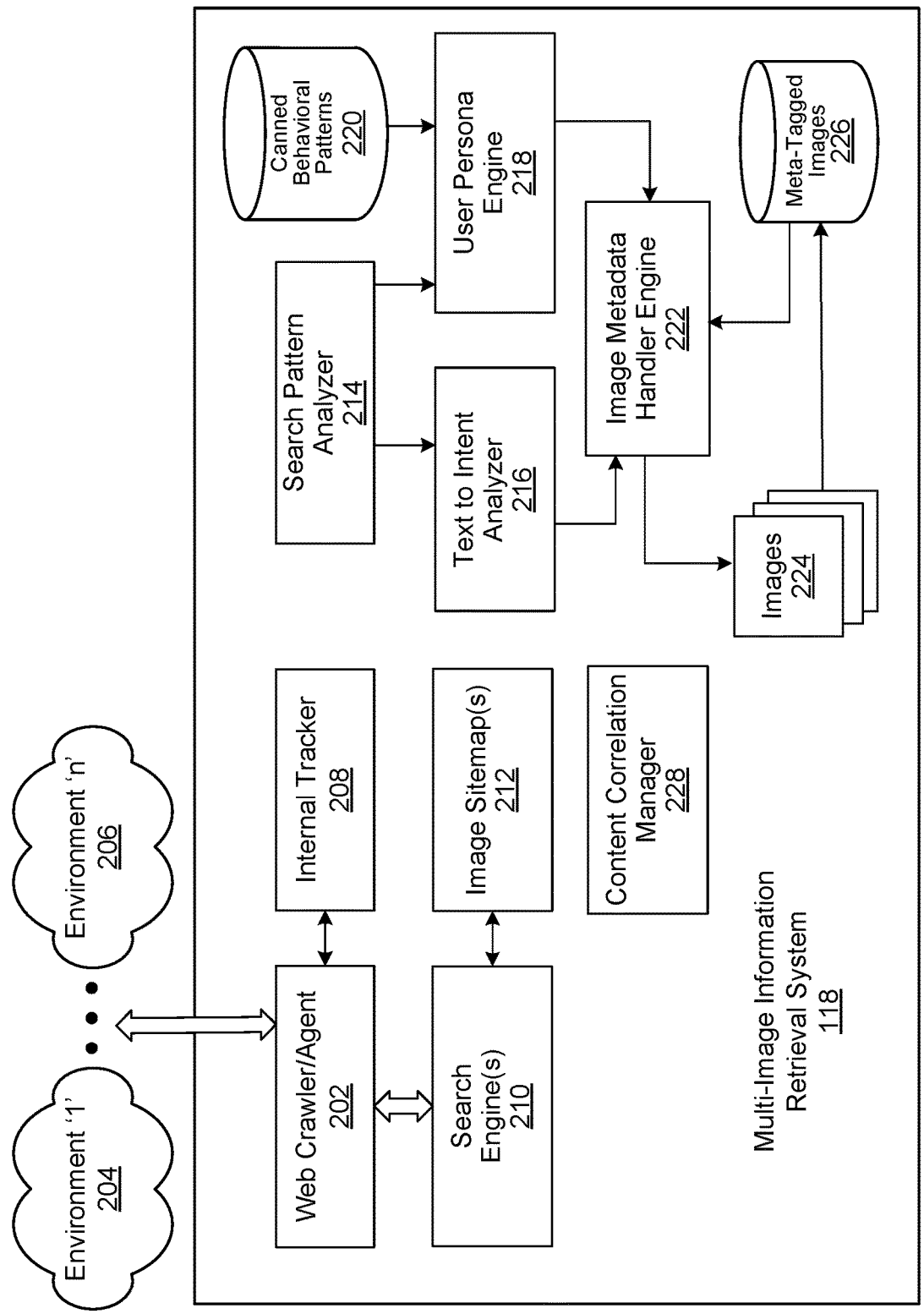
FIG. 2 is a simplified block diagram of a multi-image information retrieval system.

FIG. 2 is a simplified block diagram of a multi-image information retrieval system. In certain embodiments, the multi-image information retrieval system 118 is configured to support image search and retrieval. In certain implementations, the multi-image information retrieval system 118 is configured to generate associations between different workflows and scenarios, where the same image can be part of a solution. In certain implementations, the other image retrieval features are provided including enabling dynamic content and image correlation during an image search and providing content image correlation based on user intent.

In certain embodiments, the multi-image information retrieval system 118 includes a web crawler/agent 202. Web crawler/agent 204 can be configured to interact with different sites, platforms, or environments that can include vendor support sites, social media sites, data repositories, etc. Such sites, platforms, or environments are represented as environment '1' 204 through environment 'n' 206. The environment '1' 204 through environment 'n' 206 can include different images of the same product or product line. The web crawler/agent 202 can be configured to crawl through the different images of the same product or product line resident on environment '1' 204 through environment 'n' 206. The web crawler/agent 202 can include or be configured to an internal tracker 208 which can be used to describe end to end workflows based on image metadata and embedded text within the images. The end to end workflows can be described by one or more images. Metadata is data or information that provides information as to other data. Metadata may be written in an image and provide information as to that image.

In certain embodiments, the multi-image information retrieval system 118 includes one or more search engines 210. Image searching can be performed on different search engines of the one or more search engines 210, where the image searching is based on the same set of source files. The multi-image information retrieval system 118 can include one or more image sitemaps 212. In certain implementations, when a set of images is identified as a work flow, the image sitemaps 212 is/are updated with hints and clues as to image retrieval. Sitemaps 212 can be implemented to accommodate image related data, such as metadata associated with images. Sitemaps 212 can be used to inform the search engines 210 as to uniform resource locators (URL) of websites that are available for crawling. Furthermore, additional information regarding the URLs can be provided by sitemaps 212.

It is desirable to understand users' intent as to search queries, and to provide a behavior learning implementation. Information can be consumed in many ways; however, users' behaviors are different and can vary based on request factors and search terms, although information is constant. By taking an "n" by "1" (i.e., n×1) approach, where "n" is the different ways that users are looking for information, with different key phrases that are used for a specific search, and "1" is a piece of information, at any given point of time which information is appearing as a search result against a specific key phase). Since "n" is not constant, an algorithm is implemented that can learn and re-learn users' behavior patterns over a period of time, where the information is kept static/same. This can be a continuous process that analyzes information consumed during user sessions against a business-driven logical structure and a product driven theme structure. In addition, the process performs analysis on segmentation of each information set that is consumed/used.

In certain embodiments, in order to meet users' search queries when such searches are image based, the following are implemented by the multi-image information retrieval system 118. In certain implementations, a search pattern analyzer 214 processes information data from users' image search sessions. In particular, the search pattern analyzer 214 is configured to process image metadata, which includes key phrases that searched that are correlated to different user behavior patterns and associated with users' intents. The search pattern analyzer 214 is further configured to process content that appears during different string or text searches. A text to intent analyzer 216 receives information/data from the search pattern analyzer 214. The text to intent analyzer 216 can be implemented to segregate text based on a user's persona or intent, and keep an association based on the link to an image.

In this implementation, the search pattern analyzer 214 further provides information/data to a user persona engine 218 directed to user intent. The user persona engine 218 processes particular user persona using information/data from canned or predetermined behavior patterns 220 and can also modify such user persona based on information/data from the search pattern analyzer 214. Information as to user persona can change based on image searches.

In this implementation, an image metadata handler engine 222 receives images with information/data from the text to intent analyzer 216 and users' persona from the user persona engine 218. The image metadata handler engine 222 can be configured to correlate image metadata with associated text for different user behavior patterns. The image metadata handler engine 222 provides images 224 that include image metadata that have user persona describing user behavior patterns. The images 224 can be stored in meta-tagged images 226. The meta-tagged images 226 include images of a meta-tagged corpus of unique responses for different user types/persona. For certain implementations, images from meta-tagged images 226 can be sent to the image metadata handler engine 222 for continued processing. Therefore, personalized content searching can be provided through image searching based on users' profiles and intent. In addition, information infrastructures can be enabled with image driven content with dynamic responses based on search strings and users' persona.

In certain embodiments, the multi-image information retrieval system 118 includes a content correlation manager 228. The content correlation manager 228 can be configured to correlate relevant images with text content, and correlate images to one another or with a set of images.

Figure 3:
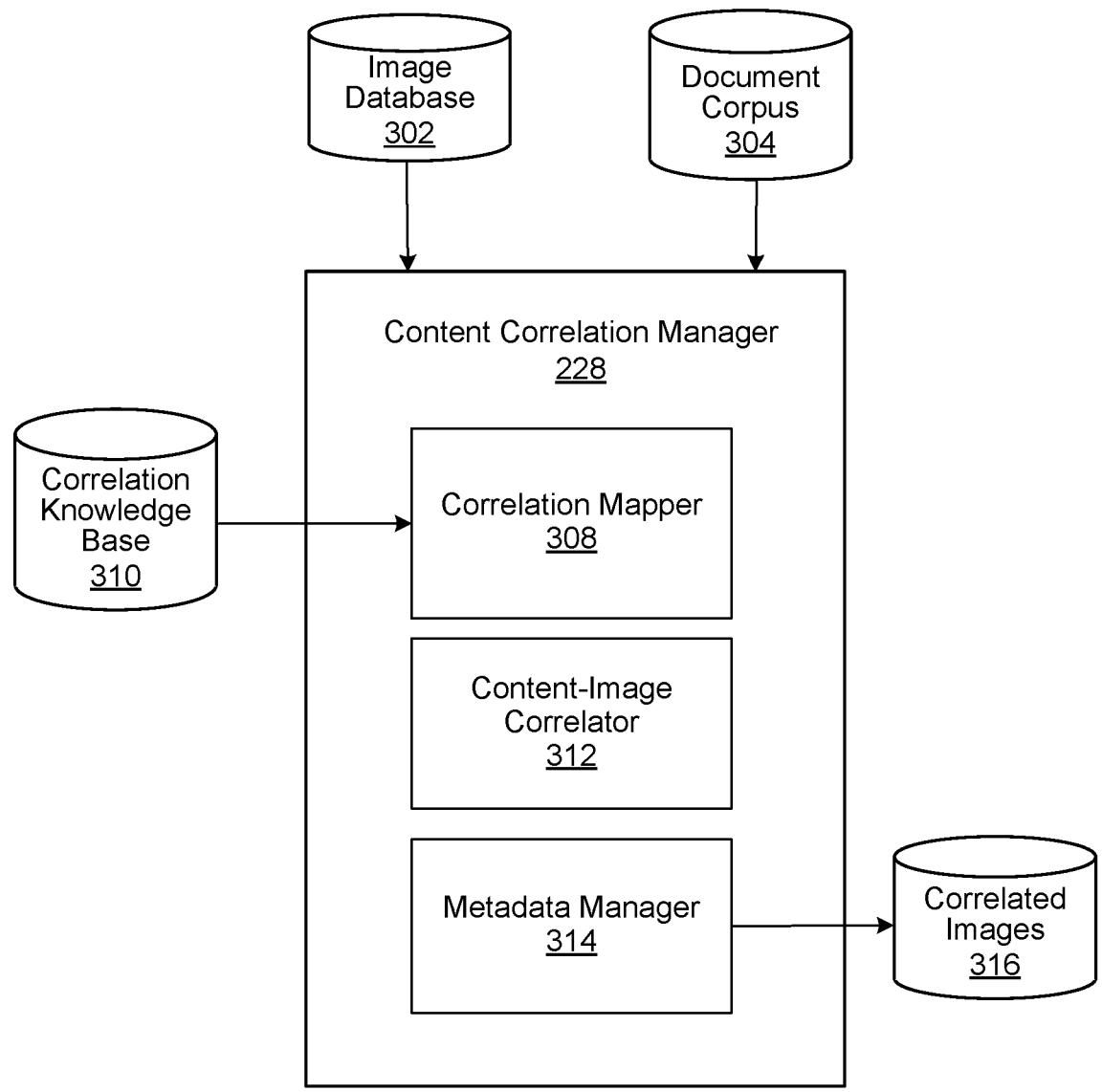
FIG. 3 is a simplified block diagram of a content correlation manager.

FIG. 3 is a simplified block diagram of a content correlation manager. For example, if a user desires to search for a particular product or product line through an image search query, the wrong image and/or information may be returned, or the returned image may have no associated content. Therefore, to implement image query searching that returns the correct images with relevant information, the content correlation manager 228 can be implemented, where the content correlation manager 228 correlates relevant images with images with text content, and correlate images to one another or with a set of images. Implementation of the content correlation manager 228 can allow for dynamic correlation between search strings and product or product line content with the ability to understand and use search queries to determine the acceptable results for users.

For example, a business may have several products or product lines. In an implementation, an image database 302 and document corpus 304 is provided. The image database 302 includes images of the products or product lines. The image database 302 includes images that may be linked to pages which are static placements. The images of image database 302 may not have any metadata information which correlates the images to content of the pages or other images of the pages. Document corpus 304 includes documents that may relate to images of image database 302.

In an implementation, a correlation mapper 308 receives information from a correlation knowledge base 310, where the information allows the correlation mapper 308 to map images of image database 302 with documents/pages in document corpus 304. In particular, the correlation knowledge base 310 includes data for content or images and relationship of the content or images to document/pages.

Figure 4:
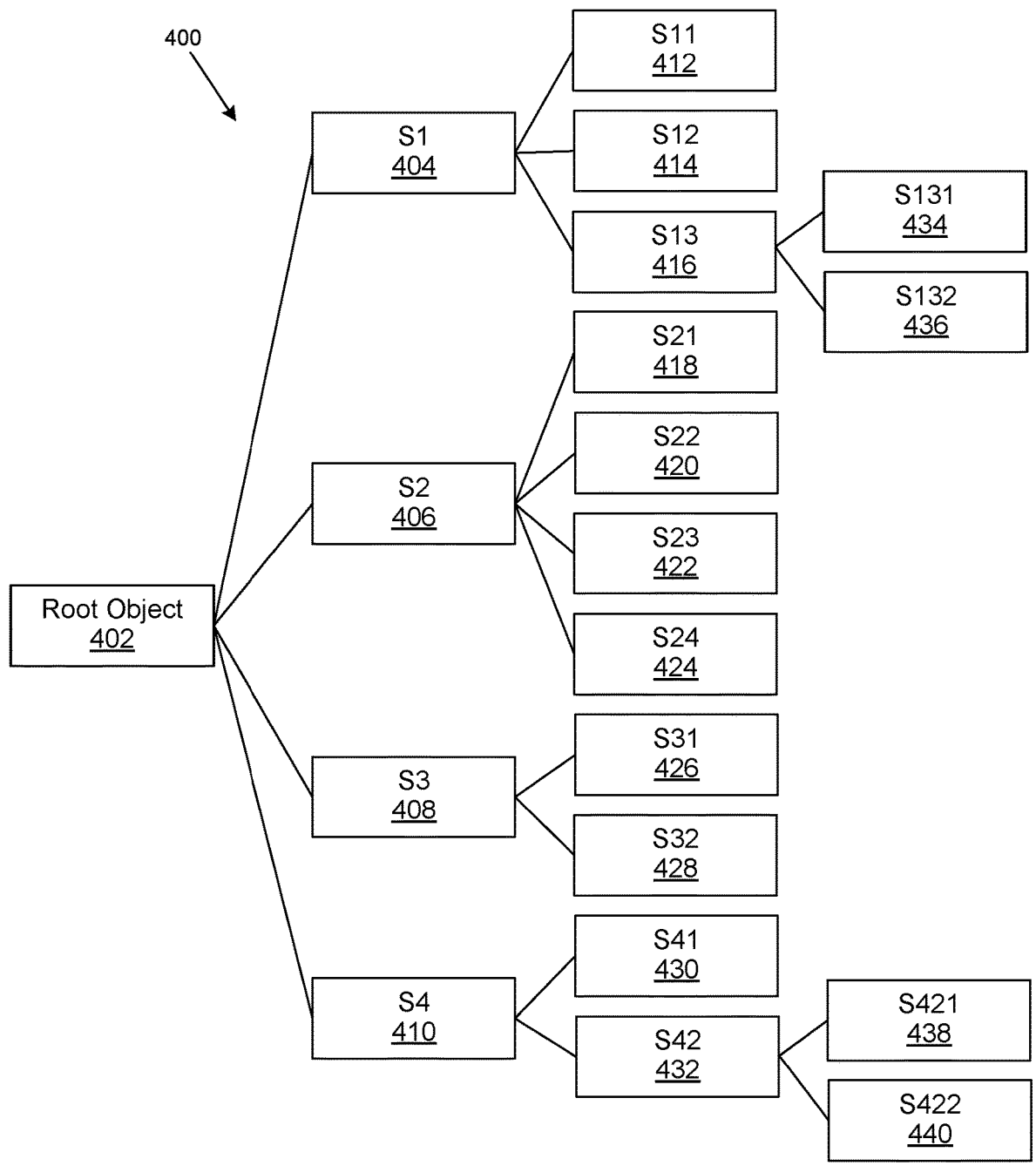
FIG. 4 is a general illustration of a root object structure.

The correlation mapper 308 can create a hierarchy tree that creates a correlation of the images of image database 302 with the content of document/pages document corpus 302. FIG. 4 shows a root object structure or hierarchy tree. A root object 402 can be a particular product, such as a computer laptop. The root object 402 can have associated images at the root level. Document subheadings S1 404, S2 406, S3 408, and S4 410 can have first level information and related images about different aspects of the product or product lines of root object 402. Subheadings S11 412, S12 416, and S13 418 provide additional second level information and related images as to subheading S1 404. Subheadings S22 420, S23 422, and S24 424 provide additional second level information and related images as to subheading S2 406. Subheadings S31 426 and S32 428 provide additional second level information and related images as to subheading S3 408. Subheadings S41 430 and S42 432 provide additional second level information and related images as to subheading S4 410. Subheadings S131 434 and S132 436 provide additional third level information and related images as to subheading S13 416. Subheadings S421 438 and S422 440 provide additional third level information and related images as to subheading S42 432. Such an information chain or hierarchy tree can also be used for image names in URLs and image metadata information. The document heading to subheading relationships ca be translated to a correlated heading image naming convention and a hierarchical key word translation.

Referring back to FIG. 3, the hierarchy tree 400, and other hierarchy trees, is based on content and data from correlation knowledge base 310. The content correlation manager 306 can further include a content image correlated 312 that processes root object images from correlation mapper 308. A metadata manager 314 processes metadata information related to the images, and provides correlated images to a correlated images database 316. As discussed above, the hierarchy tree can include be used for image names in URLs and image metadata information. Examples of image metadata information include for Keywords: for a field name="mwg-kw:Keywords", having a value type of "KeywordInfo" which can be a main structure for containing keyword based information. For Keywordinfo: for a field name="mwg-kw:Hiearchy", having a value type of "Bag of KeywordStruct" which can be a list of root keyword structures. For "KeywordStruct": with a first field name of =mwg-kw:Keyword, having a value type of "Text" which can be a name of keyword (−node). For "KeywordStruct": with a second field name of =mwg-kw:Applied, having a value type of "Boolean" which can "True" if the keyword has been applied, and "False" otherwise, and if missing "mwg-kw:Applied" is assumed "True" for leaf nodes and "False" for ancestor nodes. For "KeywordStruct": with a third field name of =mwg-kw:Children, having a value type of "Bag of KeywordStruct" which can be a list of children Keywords structures.

By implementing the processes described, during image searching, image and content correlation and representation of associated textual information can be provided. In addition, hierarchical and structure metadata identification for images can be associated with correlated information from different sources.

Figure 5:
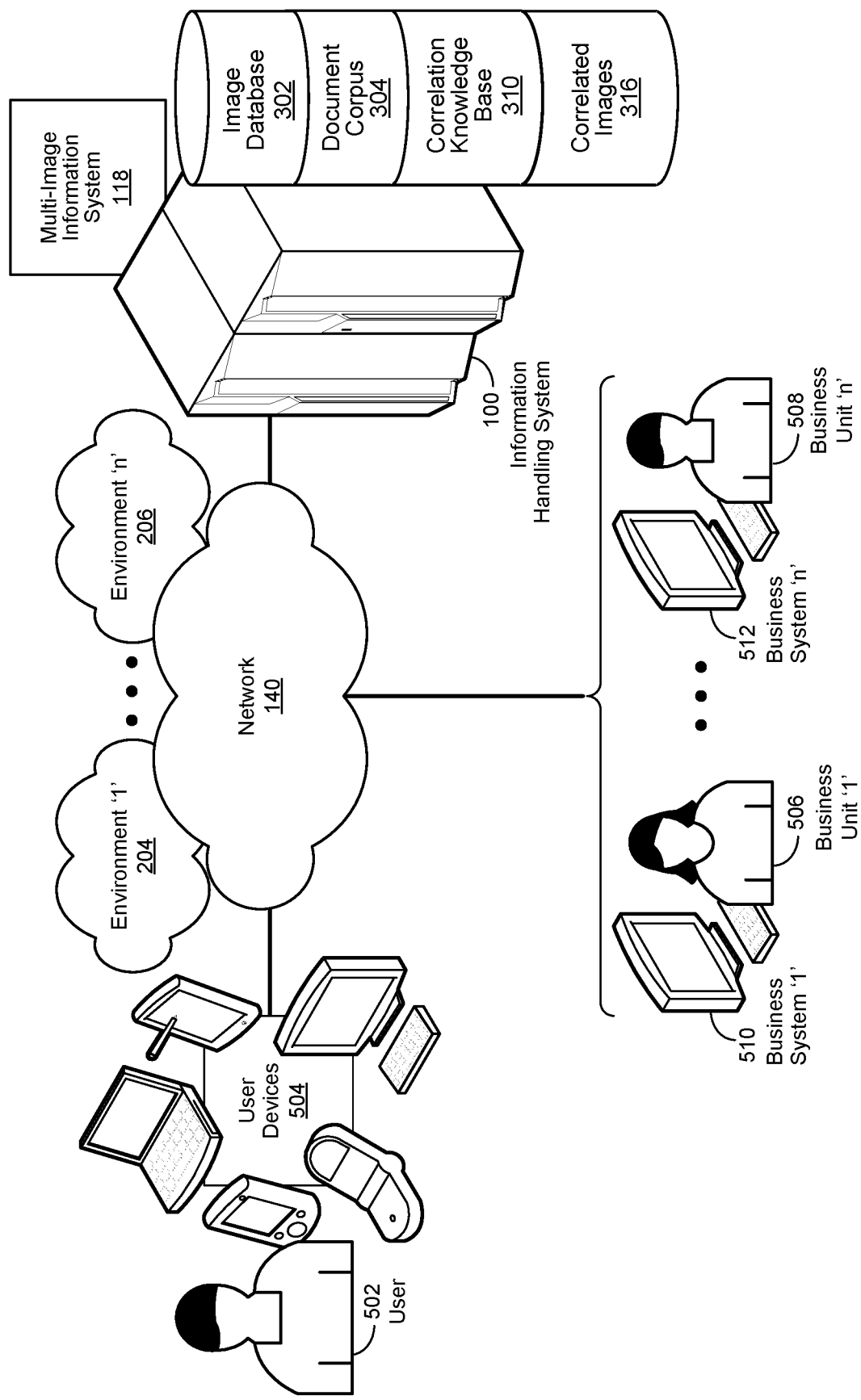
FIG. 5 is a simplified block diagram of a multi-image information retrieval system for image search and retrieval.

FIG. 5 is a simplified block diagram of a multi-image information system 118 implemented in accordance with an embodiment of the invention for image search and retrieval. In various embodiments, a user 502 can request for images and related documents, information and solutions (e.g., workflows) through an image search query. User 502 can be representative of multiple users. Image search requests from user 502 can be through an image search query implemented by multi-image information system 118. In certain implementations, images including image clusters, and related documents/information, including solutions are returned to user 502.

In these and other embodiments, the user 502 may use a user device(s) 504 to search for images and related documents/information from multi-image information system 118. As used herein, user device(s) 504 refers to an information handling system such as a personal computer, a laptop computer, a tablet computer, a personal digital assistant (PDA), a smart phone, a mobile telephone, or other device that is capable of communicating and processing data. In various embodiments, the user device(s) 504 is used to exchange information between the information handling system 100 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In certain implementations, the information handling system 100 includes the image database 302, the document corpus 304, the correlation knowledge base 310, and correlated images 316. The multi-image information system 118 can access the image database 302, the document corpus 304, the correlation knowledge base 310, and correlated images 316.

In certain implementations, business unit '1" 506 through business unit 'n' 508 interact with user 502. Business unit 1" 506 through business unit 'n' 508 can be administrators of multi-image information system 118. Business unit 1" 506 through business unit 'n' 508 may implement or administer the multi-image information system 118 to provide image searching and retrieval to the user 502. Communication by business unit 1" 506 through business unit 'n' 508 can be through network 140 through respective business system '1' 510 through business system 'n' 512. In certain embodiments, the business unit 1" 506 through business unit 'n' 508 can include an information design and development unit or group that provides for illustrations (i.e., images) across multiple geographic and product lines, producing images for documents. The documents can be used of enterprise, client, consumer, networking, etc. Such images can convey complex information which are specific to systems and can be reused for multiple use case scenarios. For such a business unit or group such as information design and development, it is desirable to assure that related images appear during image searching as a cluster along with relevant content/information.

Figure 6:
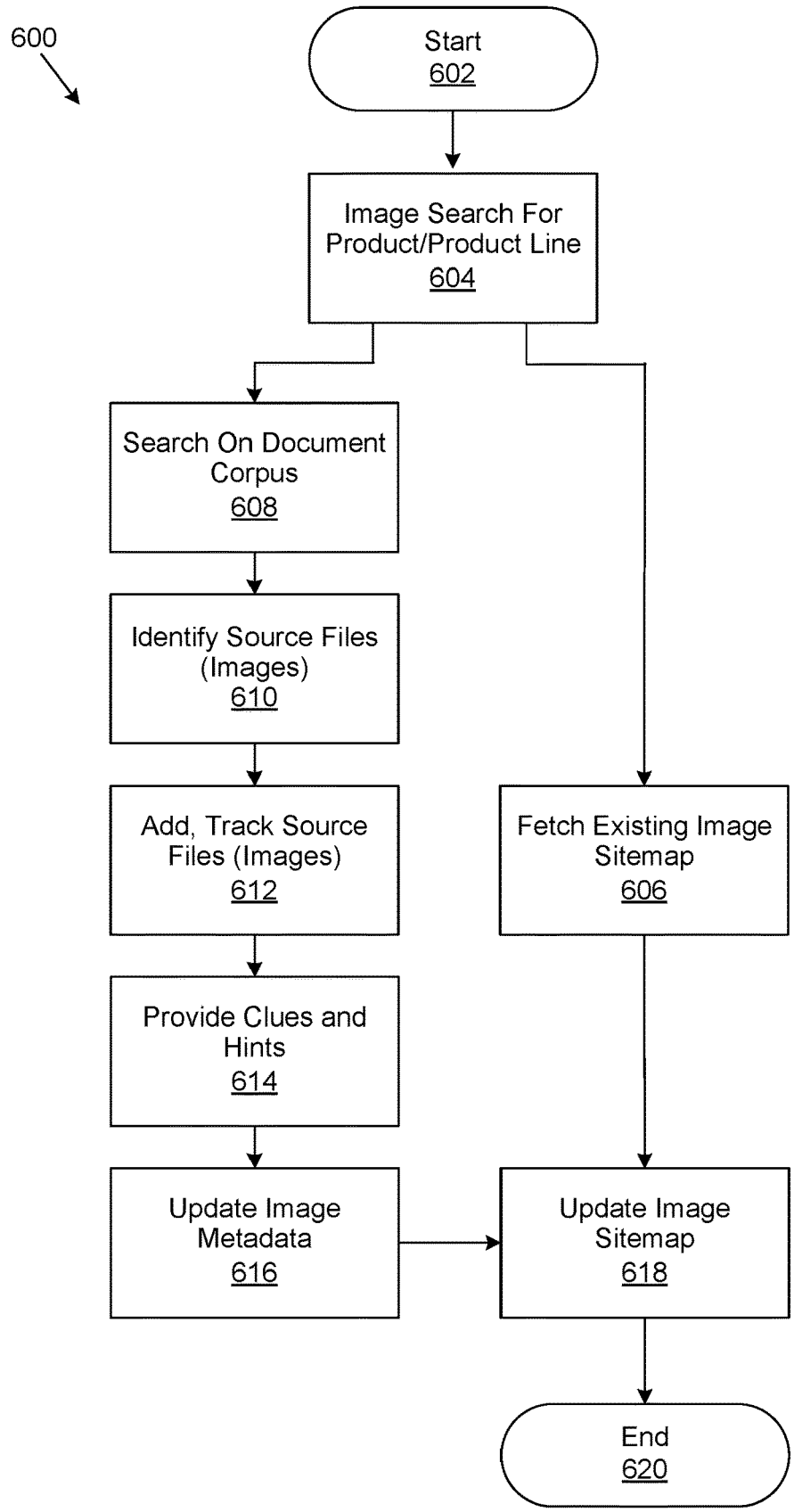
FIG. 6 is a generalized flowchart for updating an image sitemap.

FIG. 6 is a generalized flowchart 600 for updating an image sitemap. In various embodiments, the multi-image information retrieval system 118 is implemented. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

As discussed above in reference to FIG. 2, the multi-image information retrieval system 118 can implement one or more image sitemaps 212. In certain implementations, when a set of images is identified as a work flow, the image sitemaps 212 is/are updated with hints and clues as to image retrieval. Sitemaps 212 can be implemented to accommodate image related data, such as metadata associated with images. Sitemaps 212 can be used to inform the search engines 210 as to uniform resource locators (URL) of websites that are available for crawling. Furthermore, additional information regarding the URLs can be provided by sitemaps 212.

Image metadata information can include the following, where such metadata information can be used in updating an image sitemap(s). The Meta Tag <image:image.filename> may be required, describes the file name identifier for indexing, and has no associated metadata. The Meta Tag <image:source> may be required, is a multiple source of the same image and can potentially harm indexing as can confuse a web crawler (e.g. web crawler/agent 202), therefore source is locked for a particular image, and has associated metadata than can include source pages where the image is reused (e.g, <url 1>, <url 2> . . . <url n>). The Meta Tag <image:title> may be required, is a title for a specific image, and can have associated metadata to a stack of the scenarios where the image can be utilized. The Meta Tag <image:geo_location> may not be required, describes geographical limitations, and can have associated metadata and is open to allow for information to be consumed from various sources.

Now referring to FIG. 6, at block 602 the process 600 starts. In certain implementation the process is performed by the multi-image retrieval system 118 as described above. At step 604, an image search is performed on a particular product or product line. At step 606, an existing image sitemap is fetched. The existing image sitemap can be the one or more image sitemaps 212 described above. In certain implementations step 606 is performed concurrent with steps 608, 610, 612, 614 and 616. At step 608, a search on a document corpus is performed based on the particular product or product line. At step 612, related source files or images are identified. At step 614 the identified source files are added and tracked. In certain implementations, step 614 can be performed by an internal tracker such as internal tracker 208 described above. At step 614, hints and clues are provided. Such hints and clues can be used to update image sitemaps as to image retrieval as described above. At step 616, image metadata is updated. At step 618, the image sitemap is updated. At block 620, the process 600 ends.

Figure 7:
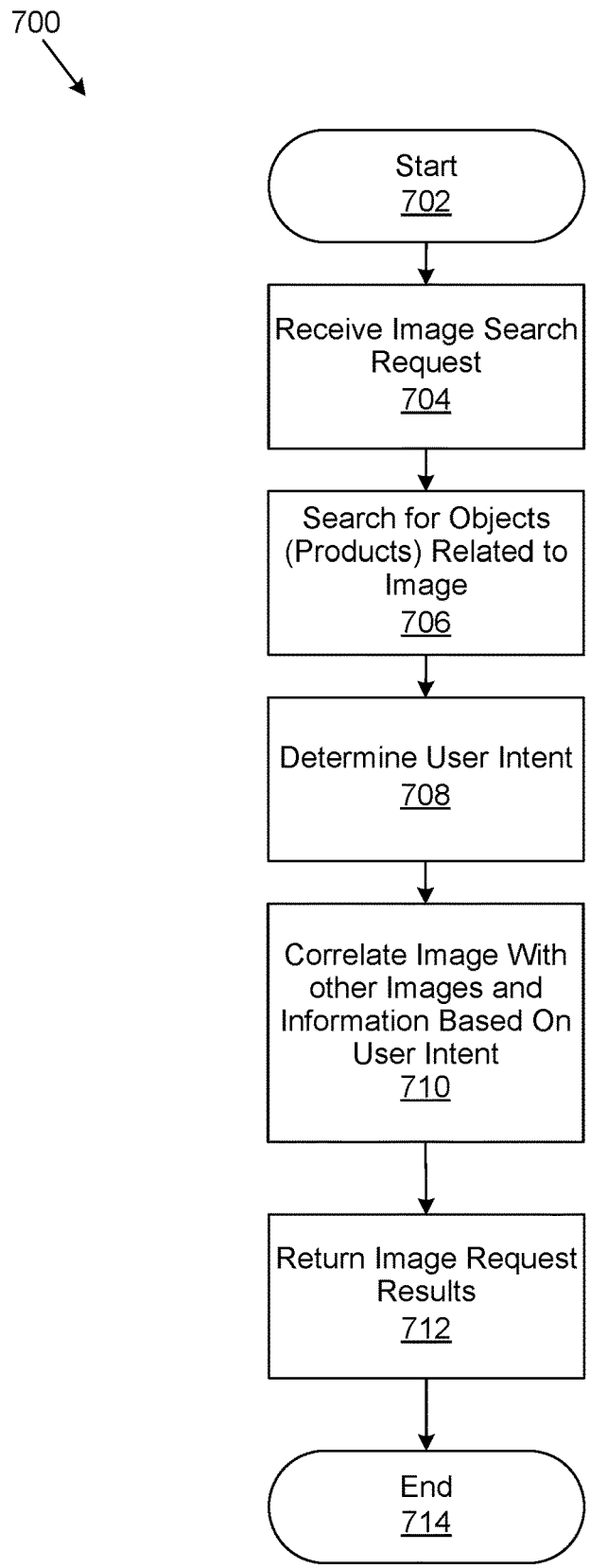
FIG. 7 is a generalized flowchart for image search and retrieval.

FIG. 7 is a generalized flowchart 700 for image search and retrieval. In various embodiments, the multi-image information retrieval system 118 is implemented. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 702, process 700 starts. At step 704 an image search request is received. The image search request can be an image search query based on a particular image. At step 706, a search for objects, such as products or product lines is performed, where the image describes objects (e.g., the products or product lines). At step 708, a determination is performed as to user intent regarding the image search. A user intent can include searching for workflow solutions regarding a product or product line. At step 710, correlation is performed as to the objects and image with other images and other information based on the user intent. At step 712, results are returned that provide correlated images and other information. At block 714, process 700 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for image search and retrieval comprising:
   receiving a search request based on an image;
   searching for objects which the image describes;
   determining user intent regarding the search request, wherein the user intent is correlated to a user behavior pattern by a search pattern analyzer that processes image meta data and key phrases, and wherein the user behavior pattern is determined by different ways users look for information using different key phrases related to a piece of information at any given time the piece of information appears against a specific key phrase;
   providing a behavior learning implementation by implementing an n×1 approach wherein n is different ways a user looks at information and 1 is piece of information at the any given point of time and is kept static;
   correlating the image with other sets of images and information related to the objects, based on the determining user intent and providing behavior implementation;
   returning search results based on correlated other sets of images and information.

2. The method of claim 1, wherein the receiving the search request is performed using one or more search engines.

3. The method of claim 2, wherein the one or more search engines perform image searching based on a same set of source files.

4. The method of claim 1, wherein the determining user intent is based on user image search sessions.

5. The method of claim 1, wherein the determining user intent is based on predetermined behavior patterns.

6. The method of claim 1, wherein the correlating includes creating a tree hierarchy of a root object that describes an object.

7. The method of claim 1 wherein the search results include workflow solutions related to the objects.

8. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations for improved management of unattended user queries and comprising instructions executable by the processor and configured for:
   performing an image search request;

searching for products related to the image which an image describes;

determining user intent regarding the search request, wherein the user intent is correlated to a user behavior pattern by a search pattern analyzer that processes image meta data and key phrases, and wherein the user behavior pattern is determined by different ways users look for information using different key phrases related to a piece of information at any given time the piece of information appears against a specific key phrase;

providing a behavior learning implementation by implementing an n×1 approach wherein n is different ways a user looks at information and 1 is piece of information at the any given point of time and is kept static;

based on the determining user intent and providing behavior implementation; correlating the image that the image request is based, with other images and information related to the products;

returning search results based on correlated images.

9. The system of claim 8, wherein the performing implements one or more search engines.

10. The system of claim 8, wherein the searching implements dynamic correlation between search strings and the products.

11. The system of claim 8, wherein the user intent is based on user persona information.

12. The system of claim 8, wherein meta-tagged images include responses for different user persona as to user intent.

13. The system of claim 8, wherein the images include metadata.

14. The system of claim 8, wherein the correlating includes correlating images with work flow solutions.

15. A non-transitory, computer-readable storage medium embodying computer program code, the computer program code comprising computer executable instructions configured for:

performing a search request based on an image;

searching for an object which the image describes;

determining user intent regarding the search request, wherein the user intent is correlated to a user behavior pattern by a search pattern analyzer that processes image meta data and key phrases, and wherein the user behavior pattern is determined by different ways users look for information using different key phrases related to a piece of information at any given time the piece of information appears against a specific key phrase;

providing a behavior learning implementation by implementing an n×1 approach wherein n is different ways a user looks at information and 1 is piece of information at the any given point of time and is kept static; based on the determining user intent and providing behavior implementation correlating the image with other images and information related to the object; returning search results based on correlated images.

16. The non-transitory, computer-readable storage medium of claim 15, wherein the performing a search request is implemented with one or more search engines.

17. The non-transitory, computer-readable storage medium of claim 15, wherein the user intent is based on user personal information.

18. The non-transitory, computer-readable storage medium of claim 15, wherein the user intent is based on predetermined behavior patterns.

19. The non-transitory, computer-readable storage medium of claim 15, wherein the correlating includes creating a tree hierarchy of a root object that describes an object.

20. The non-transitory, computer-readable storage medium of claim 15, wherein correlating includes correlating images with work flow solutions.

\* \* \* \* \*